Patented May 29, 1951

2,555,270

UNITED STATES PATENT OFFICE 2,555,270

ETHERS OF 2-BUTENE-1,4-DIOL

George F. Deebel, Dayton, Ohio, assignor to Monsanto Chemical Company, St. Louis, Mo., a corporation of Delaware No Drawing. Application January 10, 1947, Serial No. 721,465

3 Claims. (Cl. 260—615)

The present invention relates to certain new aliphatic diethers of 2-butene-1,4-diol and to a process for producing the same.

According to this invention, diethers of 2-butene-1,4-diol having the general formula:

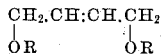

wherein R is an aliphatic, saturated hydrocarbon radical of from 4 to 12 carbon atoms, are obtained by reaction of 1,4-dichlor-2-butene with an alkali metal alcoholate of from 4 to 12 carbon atoms. As illustrative of new compounds having the above general formula may be mentioned 1,4-dibutoxy-, 1,4-dipentoxy-, 1,4-dihexoxy-, 1,4-di-isooctoxy-, and 1,4-dilauroxy-2-butene.

The dialkyl ethers of 2-butene-1,4-diol having the above general formula are stable and colorless compounds which range from viscous liquids to waxy solids. These higher diethers, i. e., ethers in which alkyl group contains from 4 to 12 carbon atoms constitute a new class of intermediates for the preparation of highly valuable commercial products as surface-active agents, water-repellents, etc. In themselves they find application as plasticizing agents for natural or synthetic resins or plastics or as additives to lubricants for the purpose of improving the viscosity characteristics thereof.

Although I am aware of the fact that 1,4-diethoxy-2-butene has been previously prepared by reaction of 1,4-dibromo-2-butene with sodium alcoholate, the present invention provides a more industrially feasible process for the preparation of the higher diethers of 2-butene-1,4-diol by employing the readily available 1,4-dichloro-2-butene.

I obtain the dialkyl ethers of 2-butene-1,4-diol by proceeding substantially as follows:

The 1,4-dichlorobutene-2 is added rapidly, with good mixing, to from 2 to 3 molecular equivalents of the appropriate alkali metal alcoholate. When employing the lower molecular weight alcoholates, sodium chloride precipitates at once. When higher alcohols are used the mixture must sometimes be heated to induce reaction. Inasmuch as the reaction is strongly exothermic, too high a temperature must be avoided, as side reactions forming vinylacetylene and 1-chlorobutadiene-1,3 take place very readily. However, by heating to moderate temperatures, e. g., to temperatures of from 30–80° C., and preferably from 30–35° C., excellent yields of the diethers are obtained and the side reactions lessened. In order to avoid local heat concentration, and hence the formation of by-products, it is advantageous to stir the mixture vigorously during reaction. On a laboratory scale, the reaction is substantially complete after about 30 minutes. The mixture is still alkaline at this stage and should be made neutral with acid before distillation. Failure to acidify before distillation results in low yields of diethers with a corresponding increase of vinylacetylene and 1-chlorobutadiene-1,3. The sodium chloride may be filtered off before distillation, but does not necessarily have to be removed.

The invention is further illustrated, but not limited, by the following examples:

Example 1

Sodium n-butylene was prepared by dissolving 18.4 grams (0.8 mol) of sodium in 250 cc. of n-butyl alcohol. To the resulting solution there was then added slowly, at room temperature and with rapid stirring, 50 g. (0.4 mol) of 1,4-dichloro-2-butene. The reaction mixture was then warmed until evolution of a small amount of a gaseout product (vinyl-acetylene) had ceased. A small amount of low-boiling compounds was removed from the reaction mixture by distillation to a temperature of 70° C.; the residue was acidified with hydrochloric acid, cooled and filtered free of sodium chloride. Distillation of the filtrate under reduced pressure gave substantially pure 1,4-dibutoxy-2-butene, B. P. 100° C./6 mm., $n_D^{20}$ 1.4345, $$d_{20}^{20}\ 0.8637$$

M. R. calcd. 60.45, found 60.37, and analyzing as follows:

|  | Per Cent C | Per Cent H |
|---|---|---|
| calcd. for $C_{12}H_{24}O_2$ | 72.00 | 12.00 |
| found | 71.84 | 11.72 |

Example 2

18.4 g. (0.8 mol) of sodium was mixed with 250 cc. of n-amyl alcohol until solution was complete. To the resulting product there was added slowly, with stirring and at room temperature, 50 g. (0.4 mol) of 1,4-dichlorobutene-2. The solution was subsequently refluxed until reaction was complete. The reaction mixture was then heated to a temperature of 60° C. in order to remove low-boiling material. The residue was acidified, filtered free of sodium chloride and the filtrate distilled under reduced pressure. There was thus obtained substantially pure 1,4-dipentoxy-2-butene, B. P. 105° C./6 mm., $n_D^{20}$ 1.4385, $d_{20}^{20}$ 0.8541

M. R. calcd. 69.7, found 70.16 and analyzing as follows:

|  | Per Cent C | Per Cent H |
|---|---|---|
| calcd. for $C_{14}H_{28}O_2$ | 73.68 | 12.28 |
| found | 74.10 | 12.04 |

Example 3

To 1 liter of n-hexanol there was added 46 g. (2 mols) of sodium. To the cooled solution there was then gradually added, with stirring, 125 g. (1 mol) of 1,4-dichlorobutene-2. As the mixture became warm, sodium chloride slowly precipitated. The whole was heated for approximately 20 minutes, at the end of which time gases began to evolve. The reaction mixture was cooled, acidified with hydrogen chloride and filtered free of sodium chloride. Upon distillation of the filtrate under reduced pressure there was obtained a mixture of cis- and trans-1,4-dihexoxy-2-butenes, B. P. 125-140° C./3 mm. Redistillation of the mixture gave substantially pure trans-1,4-dihexoxy-2-butene, B. P. 135-136° C./3 mm., $n_D^{20}$ 1.443, $d_{20}^{20}$ 0.8619

M. R. calcd. 78.93, found 78.73, and analyzing as follows:

|  | Per Cent C | Per Cent H |
|---|---|---|
| calcd. for $C_{16}H_{32}O_2$ | 75.00 | 12.50 |
| found | 75.47 | 12.61 |

Example 4

18.4 g. (0.8 mol) of sodium was dissolved in 300 cc. lauryl alcohol, B. P. 131-135° C./8 mm., and 300 cc. of toluene was then added to the solution. Upon cooling the solution, there was added 50 g. (0.4 mol) of 1,4-dichloro-2-butene, while employing rapid mechanical stirring and cooling with tap water. Later, during a period of 2 hours, the mixture was heated to a temperature of from 75-80° C. Considerable foam and froth developed. Although no solid sodium chloride was observed, positive ionic chloride tests were obtained. The emulsion was broken by the addition of hydrochloric acid and ethanol. Warming of the solution caused the solids to liquefy. The water layer was decanted and discarded, and the toluene layer was submitted to distillation under reduced pressure. In this way there was obtained a fraction, B. P. 290-302° C./6 mm., from which, by redistillation, there was obtained substantially pure 1,4-dilauroxy-2-butene, B. P. 300-303° C./6 mm., $n_D^{20}$ 1.4560, $d_{20}^{20}$ 0.8578

M. R. calcd. 134.37, found 134.3, and analyzing as follows:

|  | Per Cent C | Per Cent H |
|---|---|---|
| calcd. for $C_{28}H_{56}O_2$ | 79.40 | 13.20 |
| found | 80.04 | 13.52 |

The above examples describe the preparation of new aliphatic diethers of 2-butene-1,4-diol. These new ethers are of interest in the manufacture of such industrially valuable products as surface active agents, water-proofing agents, insecticides, etc., in that to the olefinic double bond thereof there may be readily added, e.g., sulfonic acid groups, radicals containing the amino or cyano groups, or other radicals which contribute to the surface activity, water-repellent and insecticidal properties of a compound. As has been already noted, the diethers in which the alcoholic alkyl radical contains from 4 to 12 carbon atoms are particularly valuable as intermediates for the preparation of synthetic detergents and wetting agents. The present diethers find application in the plastics industry, for example, the dilauryl ether has a pronounced plasticizing effect on cellulose esters as well as on synthetic resins of the vinyl type.

Instead of the sodium alcoholates which are disclosed in the above examples, I may use other alkali metal alcoholates for the preparation of the corresponding 2-butene-1,4-diol diethers, for example, there may be employed potassium instead of sodium alcoholates. Alkali metal alcoholates of the mixtures of alcohols obtained by hydrogenation of carbon monoxide or of the mixtures of alcohols obtained by hydrogenation of the higher fatty acids such as technical stearic acid may also be employed.

The reaction may be effected in the presence of a solvent or a diluent, the employment of such a material being especially advantageous when the alcoholic component is a solid like cetyl alcohol. Likewise, reaction may be effected at either ordinary, increased or reduced pressure, the use of reduced pressure being particularly advantageous in the preparation of the higher aliphatic diethers.

This application is a continuation-in-part of my application Serial No. 468,819, filed December 12, 1942, now Patent Number 2,426,863, issued September 2, 1947.

What I claim is:
1. Compounds having the general formula:

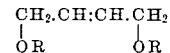

where R is an alkyl radical selected from the group of alkyl radicals consisting of 8 and 12 carbon atom alkyl radicals.
2. 1,4-dilauryloxy-2-butene.
3. 1,4-diisooctyloxy-2-butene.

GEORGE F. DEEBEL.

REFERENCES CITED

The following references are of record in the file of this patent:

UNITED STATES PATENTS

| Number | Name | Date |
|---|---|---|
| 2,079,758 | Berchet | May 11, 1937 |
| 2,102,611 | Carothers | Dec. 21, 1937 |
| 2,136,387 | Lott | Nov. 15, 1938 |
| 2,167,639 | Coleman | Aug. 1, 1939 |

OTHER REFERENCES

MacAllum et al.: Trans. Roy. Soc. Can., vol. 22 (1928), pages 33-38.

Chem. Abstracts, vol. 30, page 4809 (1936).

Norris et al.: "Jour. Am. Chem. Soc.," vol. 61 (1939), page 887.